United States Patent [19]

Newkirk et al.

[11] Patent Number: 4,828,785

[45] Date of Patent: May 9, 1989

[54] INVERSE SHAPE REPLICATION METHOD OF MAKING CERAMIC COMPOSITE ARTICLES

[75] Inventors: Marc S. Newkirk; Andrew W. Urquhart; H. Daniel Lesher, all of Newark, Del.

[73] Assignee: Lanxide Technology Company, LP, Newark, Del.

[21] Appl. No.: 823,542

[22] Filed: Jan. 27, 1986

[51] Int. Cl.⁴ .................................................. C04B 33/32
[52] U.S. Cl. .......................................... 264/59; 264/60; 264/82
[58] Field of Search .................... 264/57, 59, 60, 65, 264/82, 317; 501/98, 127, 128

[56] References Cited

U.S. PATENT DOCUMENTS

| | | | |
|---|---|---|---|
| 2,741,822 | 4/1956 | Udy | 264/59 |
| 3,255,027 | 6/1966 | Talsma | 106/65 |
| 3,296,002 | 1/1967 | Hare | 106/40 |
| 3,298,842 | 1/1967 | Seufert | 106/65 |
| 3,419,404 | 12/1968 | Mao | 106/65 |
| 3,421,863 | 1/1969 | Bawa et al. | 29/182.5 |
| 3,437,468 | 4/1969 | Seufert | 51/298 |
| 3,473,938 | 10/1969 | Oberlin | 106/57 |
| 3,473,987 | 10/1969 | Sowards | 156/89 |
| 3,538,231 | 11/1970 | Newkirk | 373/117 |
| 3,789,096 | 1/1974 | Church et al. | 264/60 |
| 3,864,154 | 2/1975 | Gazza et al. | 29/123 B |
| 3,973,977 | 8/1976 | Wilson | 106/62 |

FOREIGN PATENT DOCUMENTS

| | | |
|---|---|---|
| 0116809 | 8/1984 | European Pat. Off. . |
| 0155831 | 9/1985 | European Pat. Off. . |
| 0169067 | 1/1986 | European Pat. Off. . |

OTHER PUBLICATIONS

"Oxidation of Molten Aluminum Alloys, Reaction with Refractories"–M. Drouzy and M. Richard–Mar. 1874–Fonderies, France No. 332 pp. 121–128.
"Refractories for Aluminum Alloy Melting Furnaces"–'–B. Clavaud and V. Jost–Sep. 1980–Lillian Brassinga (from French) Jan. 1985.

Primary Examiner—Ivars Cintins
Attorney, Agent, or Firm—Mark G. Mortenson; William E. McShane

[57] ABSTRACT

A method of producing a self-supporting ceramic composite body having therein at least one cavity which inversely replicates the geometry of a positive mold of parent metal. The method, includes embedding the mold of parent metal within a conformable bed of filler to provide there in a cavity shaped and filled by the mold. The assembly is heated to melt the parent metal mold, e.g., an aluminum parent metal mold, and contacted with an oxidant to oxidize the molten parent metal to form a polycrystalline material which grows through the surrounding bed of filler, the molten metal being drawn through the growing polycrystalline material to be oxidized at the interface between the oxidant and previously formed oxidation reaction product whereby the cavity formerly filled by the mold of parent metal is eventually evacuated of the metal. There remains behind a cavity whose shape inversely replicates the original shape of the mold. The method provides ceramic composite articles having therein at least one cavity inversely replicating the shape of the mold which supplied the parent metal for oxidation.

38 Claims, 2 Drawing Sheets

INVERSE SHAPE REPLICATION METHOD OF MAKING CERAMIC COMPOSITE ARTICLES

BACKGROUND OF THE INVENTION

1. Field Of The Invention

The present invention broadly relates to ceramic composite bodies having one or more shaped cavities therein and to methods of making the same. In particular, the invention relates to ceramic composite bodies comprising a polycrystalline matrix embedding a filler and having at least one cavity of selected geometry formed therein, and to methods of making the composites by infiltrating a bed of filler with the oxidation reaction product of a parent metal preshaped as a positive mold which is inversely replicated to form the cavity of the ceramic composite.

2. Description of Commonly Owned Patent Applications

The subject matter of this application is related to that of copending and Commonly Owned U.S. patent application Ser. Nos. 819,397, filed Jan. 17, 1986, which is a continuation-in-part of 697,876, filed Feb. 4, 1985, both in the names of Marc S. Newkirk et al and entitled "Composite Ceramic Articles and Methods of Making Same." These copending applications disclose a novel method for producing a self-supporting ceramic composite by growing an oxidation reaction product from a parent metal into a permeable mass of filler. The resulting composite, however, has no defined or predetermined configuration.

The method of growing a ceramic product by an oxidation reaction is disclosed generically in Commonly Owned U.S. Pat. No. 4,713,360 which issued on Dec. 15, 1987 and was based on U.S. application Ser. No. 818,943, filed Jan. 15, 1986 as a continuation-in-part of Ser. No. 776,964, filed Sept. 17, 1985, which is a continuation-in-part of Ser. No. 705,787, filed Feb. 26, 1985, which is a continuation-in-part of Ser. No. 591,392, filed Mar. 16, 1984, all in the names of Marc S. Newkirk et al and entitled "Novel Ceramic Materials and Methods of Making The Same." The employment of an unusual oxidation phenomenon as described in the aforesaid Commonly Owned patent applications, which may be enhanced by the use of an alloyed dopant, affords self-supporting ceramic bodies grown as the oxidation reaction product from a precursor parent metal and a method of making the same. The method was improved upon by the use of external dopants applied to the surface of the precursor parent metal as disclosed in Commonly Owned U.S. applications Ser. No. 822,999, filed Jan. 27, 1986, which is a continuation-in-part of Ser. No. 776,965, filed Sept. 17, 1985, which is a continuation-in-part of Ser. No. 747,788, filed June 25, 1985, which is a continuation-in-part of Ser. No. 632,636, filed July 20, 1984, all in the names of Marc S. Newkirk et al and entitled "Methods of Making Self-Supporting Ceramic Materials".

The entire disclosures of each of the foregoing Commonly Owned patent applications are expressly incorporated herein by reference.

BACKGROUND AND PRIOR ART

In recent years, there has been increasing interest in the use of ceramics for structural applications historically served by metals. The impetus for this interest has been the superiority of ceramics with respect to certain properties, such as corrosion resistance, hardness, modulus of elasticity, and refractory capabilities when compared with metals. However, there remains a major requirement for improved strength under tensile loading, greater damage tolerance (toughness) and improved performance reliability if ceramic components are to enjoy full commercial success.

Current efforts at producing higher strength, more reliable, and tougher ceramic articles are largely focused upon (1) the development of improved processing methods for monolithic ceramics and (2) the development of new material compositions, notably ceramic matrix composites. A composite structure is one which comprises a heterogeneous material, body or article made of two or more different materials which are intimately combined in order to atain desired properties of the composite. For example, two different materials may be intimately combined by embedding one in a matrix of the other. A ceramic matrix composite structure typically comprises a ceramic matrix which encloses one or more diverse kinds of filler materials such as particulates, fibers, rods or the like.

The traditional methods of preparing ceramic articles involve the following general steps: (1) Preparation of matrix material in powder form. (2) Grinding or milling of powders to obtain very fine particles. (3) Formation of the powders into a body having the desired geometry (with allowance for shrinkage during subsequent processing). For example, this step might be accomplished by uniaxial pressing, isostatic pressing, injection molding, tape casting, slip casting or any of several other techniques. (4) Densification of the body by heating it to an elevated temperature such that the individual powder particles merge together to form a coherent structure. Preferably, this step is accomplished without the application of pressure (i.e., by pressureless sintering), although in some cases an additional driving force is required and can be provided through the application of external pressure either uniaxially (i.e., hot pressing) or isostatically, i.e., hot isostatic pressing. (5) Finishing, frequently by diamond grinding, as required.

A considerable amount of current work is directed toward improved powder processing technologies, and although these efforts have resulted in improvements in ceramic performance, they are also complicated and generally less than cost-effective. The emphasis in such technologies has been in two areas: (1) improved methods of producing ultrafine uniform powder materials using sol-gel, plasma and laser techniques, and (2) improved methods of densification and compaction, including superior techniques for sintering, hot pressing and hot isostatic pressing. The object of these efforts is to produce dense, fine-grained, flaw-free microstructures, and, in fact, some improvements in performance capabilities in ceramics have been attained in some areas. However, these developments tend to result in dramatic Increases in the cost of producing ceramic structures. Thus, cost becomes a major restriction on the commercial application of ceramics.

Another limitation in ceramic engineering which is aggravated by modern ceramic processing is scaling versatility. Conventional processes aimed at densification (i.e., removal of voids between powder particles) are incompatible with large one-piece structural application possibilities for ceramics. An increase in article size presents several problems including, for example, increased process residence times, stringent requirements for uniform process conditions over a large process volume, cracking of parts due to nonuniform densification or thermally induced stresses, warping and sagging of parts during sintering, excessive compaction forces and die dimensions if hot pressing is used, and excessive pressure vessel costs due to internal volume and wall thickness requirements in the case of hot isostatic pressing.

When these traditional methods are applied to the preparation of ceramic matrix composite materials, additional difficulties arise. Perhaps the most serious problems concern the densification step, number (4) above. The normally preferred method, pressureless sintering, can be difficult or impossible with particulate composites if the materials are not highly compatible. More importantly, normal sintering is impossible in most cases involving fiber composites even when the materials are compatible, because the merging together of the particles is inhibited by the fibers which tend to prevent the necessary displacements of the densifying powder particles. These difficulties have been, in some cases, partially overcome by forcing the densification process through the application of external pressure at high temperature. However, such procedures can generate many problems, including breaking or damaging of the reinforcing fibers by the external forces applied, limited capability to produce complex shapes (especially in the case of uniaxial hot pressing), and generally high costs resulting from low process productivity and the extensive finishing operations sometimes required.

Additional difficulties can also arise in the blending of powders with whiskers or fibers and in the body formation step, number (3) above, where it is important to maintain a uniform distribution of the composite second phase within the matrix. For example, in the preparation of a whisker-reinforced ceramic composite, the powder and whisker flow processes involved in the mixing procedure and in the formation of the body can result in non-uniformities and undesired orientations of the reinforcing whiskers, with a consequent loss in performance characteristics.

The Commonly Owned patent applications describe new processes which resolve some of these problems of traditional ceramic technology as described more fully therein. The present invention combines these processes with additional novel concepts to remove a further limitation of ceramic technology, namely the formation of complex structures to net or near net shape, and more particularly the difficulties in formation of shapes having complicated internal cavities and especially shapes having re-entrant cavities. With such shapes, the ceramic body formation methods (step (3) above) which one would normally use are not applicable, because the internal mold required to establish the desired part geometry can not be removed after the body is formed around it. While such part geometries can be prepared by grinding the desired shape from a finished ceramic blank, this approach is rarely used because of the prohibitive costs of ceramic grinding.

The present invention provides for fabrication of ceramic composites of certain predetermined interior geometry by an unusual oxidation phenomenon which overcomes the difficulties and limitations associated with known processes. This method provides shaped cavity-containing ceramic bodies typically of high strength and fracture toughness by a mechanism which is more direct, more versatile and less expensive than conventional approaches.

The present invention also provides means for reliably producing ceramic bodies having shaped cavities therein of a size and thickness which are difficult or impossible to duplicate with the presently available technology.

SUMMARY OF THE INVENTION

In accordance with the present invention, there is provided a method for producing a self-supporting ceramic composite body having therein at least one cavity which inversely replicates the geometry of a positive pattern or mold (hereafter "mold"). The ceramic composite comprises a ceramic matrix having a filler embedded therein, the matrix being obtained by oxidation of a parent metal to form a polycrystalline material which consists essentially of the oxidation reaction product of said parent metal with an oxidant, e.g., with a vapor-phase oxidant, and, optionally, one or more non-oxidized constituents of the parent metal. The method comprises the following steps: the parent metal is shaped to provide a mold, and then is embedded within a conformable filler which inversely replicates the geometry of the shaped parent metal. The filler (1) is permeable to the oxidant when required as in the case where the oxidant is a vapor-phase oxidant and, in any case, is permeable to infiltration by the developing oxidation reaction product; (2) has sufficient conformability over the heat-up temperature interval to accommodate the differential thermal expansion between the filler and the parent metal plus the meltingpoint volume change of the metal; and (3) at least in a support zone thereof enveloping the mold, is intrinsically self-bonding only at a temperature which is above the melting point of said parent metal but below and preferably very close to the oxidation reaction temperature, whereby said filler has sufficient cohesive strength to retain the inversely replicated geometry within the bed upon migration of the parent metal as described below. The embedded shaped parent metal is heated to a temperature region above its melting point but below the melting point of the oxidation reaction product to form a body of molten parent metal, and the molten parent metal is reacted in that temperature region or interval with the oxidant to form the oxidation reaction product. At least a portion of the oxidation reaction product is maintained in that temperature region and in contact with and between the body of molten metal and the oxidant, whereby molten metal is progressively drawn from the body of molten metal through the oxidation reaction product, concurrently forming the cavity as oxidation reaction product continues to form within the bed of filler at the interface between the oxidant and previously formed oxidation reaction product. This reaction is continued in that temperature region for a time sufficient to at least partially embed the filler within the oxidation reaction product by growth of the latter to form the composite body having the aforesaid cavity therein. Finally, the resulting self-supporting composite body is separated from excess filler, if any.

In another aspect of the invention, there is provided a self-supporting ceramic composite body having therein a cavity which inversely replicates the shape or geometry of a mold of a parent metal precursor and comprises a ceramic matrix having filler incorporated therein. The matrix consists essentially of a polycrystalline oxidation reaction product having interconnected crystallites formed upon oxidation of the parent metal precursor, and optionally a metallic constituent or pores, or both, as described above.

The materials of this invention can be grown with substantially uniform properties throughout their cross section to a thickness heretofore difficult to achieve by conventional processes for producing dense ceramic structures. The process which yields these materials also obviates the high costs associated with conventional ceramic production methods, including fine, high purity, uniform powder preparation, green body forming, binder burnout, sintering, hot pressing and hot isostatic pressing. The products of the present invention are adaptable or fabricated for use as articles of commerce which, as used herein, is intended to include, without limitation, industrial, structural and technical ceramic bodies for such applications where electrical, wear, thermal, structural or other features or properties are important or beneficial, and is not intended to include recycled or waste materials such as might be produced as unwanted by-products in the processing of molten metals.

As used in this specification and the appended claims, the terms below are defined as follows:

"Ceramic" is not to be unduly construed as being limited to a ceramic body in the classical sense, that is, in the sense that it consists entirely of non-metallic and inorganic materials, but rather refers to a body which is predominantly ceramic with respect to either composition or dominant properties, although the body may contain minor or substantial amounts of one or more metallic constituents derived from the parent metal, or reduced from the oxidant or a dopant, most typically within a range of from about 1–40% by volume, but may include still more metal.

"Oxidation reaction product" generally means one or more metals in any oxidized state wherein a metal has given up electrons to or shared electrons with another element, compound, or combination thereof. Accordingly, an "oxidation reaction product" under this definition includes the product of reaction of one or more metals with an oxidant such as those described in this application.

"Oxidant" means one or more suitable electron acceptors or electron sharers and may be a solid, a liquid or a gas (vapor) or some combination of these (e.g., a solid and a gas) at the process conditions.

"Parent metal" as used in this specification and the appended claims refers to that metal, e.g., aluminum, which is the precursor for the polycrystalline oxidation reaction product, and includes that metal as a relatively pure metal, a commercially available metal with impurities and/or alloying constituents, or an alloy in which that metal precursor is the major constituent; and when a specified metal is mentioned as the parent metal, e.g., aluminum, the metal identified should be read with this definition in mind unless indicated otherwise by the context.

"Cavity" has its usual broad meaning of an unfilled space within a mass or body, is not limited to any specific configuration of the space, and includes both closed and open spaces. That is, it includes cavities which are entirely closed off from communication to the exterior of the mass or body containing the cavity, such as a cavity defining the interior of a closed, hollow body. The defined term also includes cavities which are open to such communication, e.g., by one or more passageways or openings leading to the exterior of the mass or body containing the cavity, and cavities which are themselves passageways or openings. The latter type of cavity includes, for example, a simple bore through, with openings at each end of, a cylindrical body.

DETAILED DESCRIPTION OF THE INVENTION AND PREFERRED EMBODIMENTS THEREOF

Figure 1:
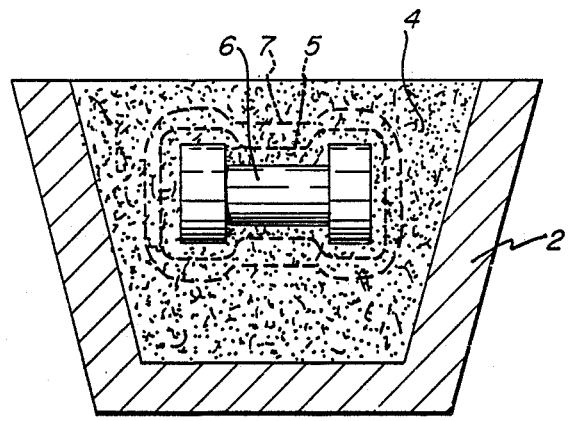
FIG. 1 is a schematic, cross-sectional view in elevation showing an assembly of a mold of shaped parent metal embedded within a bed of particulate filler and confined within a refractory vessel.

In the practice of the present invention, the parent metal is provided in the form of a mold, the geometry of which is to be inversely replicated as a cavity within the finished ceramic composite. By following the practices of the present invention, complex shapes can be inversely replicated within the finished ceramic composite during formation or growth of the ceramic, rather than by shaping or machining a ceramic body. The term "inversely replicated" means that the cavity in the ceramic composite attained by the invention process is defined by interior surfaces of the ceramic composite which are congruent to the shape of the mold of parent metal. The mold of parent metal may be suitably shaped by any appropriate means; for example, a piece of metal such as a bar, billet or ingot may be suitably machined, cast, molded, extruded or otherwise shaped to provide the shaped mold. The parent metal as the mold may have grooves, bores, recesses, lands, bosses, flanges, studs, screw threads and the like formed therein as well as having collars, bushings, discs, bars, or the like assembled thereto to provide molds of virtually any desired configuration. The parent metal mold may comprise one or more unitary pieces of metal suitably shaped so that when embedded within a conformable bed of filler, the mold defines a shaped cavity within the bed and occupies the cavity within the mass of filler. When the parent metal occupying the cavity is ultimately melted and migrates out of the filled cavity, a shaped cavity develops in the resulting ceramic composite body. Thus, in one aspect, the present invention provides the advantage of making the cavity shape by machining or forming a metal, rather than grinding or machining a ceramic, which is a much more difficult and costly process.

Although the invention is described below in detail with specific reference to aluminum as the preferred parent metal, other suitable parent metals which meet the criteria of the present invention include, but are not limited to, silicon, titanium, tin, zirconium and hafnium.

A solid, liquid or vapor-phase oxidant, or a combination of such oxidants, may be employed, as noted above. For example, typical oxidants include, without limitation, oxygen, nitrogen, a halogen, sulphur, phosphorus, arsenic, carbon, boron, selenium, tellurium, and compounds and combinations thereof, for example, silica (as a source of oxygen), methane, ethane, propane, acetylene, ethylene, and propylene (as a source of carbon), and mixtures such as air, $H_2/H_2O$ and $CO/CO_2$, the latter two (i.e., $H_2/H_2O$ and $CO/CO_2$) being useful in reducing the oxygen activity of the environment.

Although any suitable oxidants may be employed, specific embodiments of the invention are described below with reference to use of vapor-phase oxidants. If a gas or vapor oxidant, i.e., a vapor-phase oxidant, is used the filler is permeable to the vapor-phase oxidant so that upon exposure of the bed of filler to the oxidant, the vapor-phase oxidant permeates the bed of filler to contact the molten parent metal therein. The term "vapor-phase oxidant" means a vaporized or normally gaseous material which provides an oxidizing atmosphere. For example, oxygen or gas mixtures containing oxygen (including air) are preferred vapor-phase oxidants, as in the case where aluminum is the parent metal, with air usually being more preferred for obvious reasons of economy. When an oxidant is identified as containing or comprising a particular gas or vapor, this means an oxidant in which the identified gas or vapor is the sole, predominant or at least a significant oxidizer of the parent metal under the conditions obtaining in the oxidizing environment utilized. For example, although the major constituent of air is nitrogen, the oxygen content of air is the sole or predominant oxidizer for the parent metal because oxygen is a significantly stronger oxidant than nitrogen. Air therefore falls within the definition of an "oxygen-containing gas" oxidant but not within the definition of a "nitrogen-containing gas" oxidant. An example of a "nitrogen-containing gas" oxidant as used herein and in the claims is "forming gas", which contains 96 volume percent nitrogen and 4 volume percent hydrogen.

When a solid oxidant is employed, it is usually dispersed through the entire bed of filler or through a portion of the bed adjacent the parent metal, in the form of particulates admixed with the filler, or perhaps as coatings on the filler particles. Any suitable solid oxidant may be employed including elements, such as boron or carbon, or reducible compounds, such as silicon dioxide or certain borides of lower thermodynamic stability than the boride reaction product of the parent metal. For example, when a boron or a reducible boride is used as a solid oxidant for an aluminum parent metal the resulting oxidation reaction product is aluminum boride.

In some instances, the oxidation reaction may proceed so rapidly with a solid oxidant that the oxidation reaction product tends to fuse due to the exothermic nature of the process. This occurrence can degrade the microstructural uniformity of the ceramic body. This rapid exothermic reaction can be avoided by mixing into the composition relatively inert fillers which exhibit low reactivity. Such fillers absorb the heat of reaction to minimize any thermal runaway effect. An example of such a suitable inert filler is one which is identical to the intended oxidation reaction product.

If a liquid oxidant is employed, the entire bed of filler or a portion thereof adjacent the molten metal is coated or soaked as by immersion in the oxidant to impregnate the filler. Reference to a liquid oxidant means one which is a liquid under the oxidation reaction conditions and so a liquid oxidant may have a solid precursor, such as a salt, which is molten at the oxidation reaction conditions. Alternatively, the liquid oxidant may be a liquid, precursor, e.g., a solution of a material, which is used to impregnate part or all of the filler and which is melted or decomposed at the oxidation reaction conditions to provide a suitable oxidant moiety. Examples of liquid oxidants as herein defined include low melting glasses.

The conformable filler utilized in the practice of the invention may be one or more of a wide variety of materials suitable for the purpose. As used herein and in the claims, the term "conformable" as applied to the filler means that the filler is one which can be packed around, laid up against, or wound around a mold and will conform to the geometry of the mold embedded within the filler. For example, if the filler comprises particulate material such as fine grains of a refractory metal oxide, the mold is embedded by the filler so that the mold defines a filled cavity (filled or occupied by the mold). However, it is not necessary that the filler be in fine particulate form. For example, the filler may comprise wire, fibers or whiskers, or such materials as metal wool. The filler also may comprise either a heterogeneous or homogeneous combination of two or more such components or geometric configurations, e.g., a combination of small particulate grains and whiskers. It is necessary only that the physical configuration of the filler be such as to permit the mold of parent metal to be embedded by or within a mass of the filler with the filler closely conforming to the surfaces of the mold. The parent metal mold is referred to herein and in the claims as a "mold" because the cavity ultimately formed in the composite is the negative of the geometry of the mold. The mold thus initially forms a (filled) cavity within the bed of conformable filler, the cavity being initially shaped and filled by the mold.

The conformable filler useful in the practice of the invention is one which, under the oxidation reaction conditions of the invention as described below, is permeable when the oxidant is a vapor-phase oxidant, to passage therethrough of the oxidant. In any case, the filler also is permeable to the growth or development therethrough of oxidation reaction product. The filler also has at the temperature at which the oxidation reaction is conducted, sufficient cohesive strength formed or developed initially or rapidly, so as to retain the geometry inversely replicated therein by conformance of the filler to the mold as molten parent metal of the mold migrates from the cavity initially filled by the mold, to concurrently (with the migration) form the cavity. During the oxidation reaction, it appears that molten parent metal migrates through the oxidation reaction product being formed to sustain the reaction. This oxidation reaction product is generally impermeable to the surrounding atmosphere and therefore the furnace atmosphere, e.g., air, can not enter the developing cavity. In this manner, a low pressure region develops within the cavity being formed by migration of the molten parent metal. The developing skin of oxidation reaction product is usually initially too weak to support the pressure differential thus developing across it, combined with gravity forces, so that, unsupported, it tends to collapse inwardly, filling at least a part of the areas evacuated by the molten parent metal, and thereby losing the shape of the cavity established initially by the mold. Further, in cases where a vapor-phase oxidant is employed, collapse of the cavity tends to expose the parent metal liquid surface level within the cavity to the oxidant so as to create a newly defined outer surface within the original cavity which itself commences the oxidation and cavity formation process, thus completely losing the original desired shape fidelity of the developing ceramic composite body. It is even possible for this sequence to repeat numerous times, creating a misshapen body containing an internal superstructure within its cavity, bearing little or no resemblance to the original shape of the mold of parent metal. In order to avoid this loss of geometry, a filler is selected which, at a temperature above the melting point of the parent metal and close to (but below) the oxidation reaction temperature, partially sinters or otherwise bonds to itself and to the growing layer of oxidation reaction product sufficiently to provide structural strength from the outside of the cavity to retain the replicated geometry of the mold in the developing cavity at least until the growing oxidation reaction product structure attains sufficient thickness to be self-supporting against the developed pressure differential across the cavity wall.

A suitable self-bonding filler is one which, at the appropriate temperature, either intrinsically sinters or can be made to sinter or bond by appropriate additives or surface modifications of the filler. For example, a suitable filler for use with an aluminum parent metal utilizing an air oxidant comprises alumina powder with an added silica bonding agent as fine particles or castings on the alumina powder. Such mixtures of materials will partially sinter or bond at or below the oxidation reaction conditions under which the ceramic matrix will form. Without the silica additive, the alumina particles require substantially higher temperatures for bonding. Another suitable class of fillers includes particles or fibers which, under the oxidation reaction conditions of the process, form a reaction product skin on their surfaces which tends to bond the particles in the desired temperature range. An example of this class of filler in the case where aluminum is employed as the parent metal and air as the oxidant, is fine silicon carbide particles (e.g., 500 mesh and finer), which forms a silicon dioxide skin bonding themselves together in the approprite temperature range for the aluminum oxidation reaction.

It is not necessary that the entire mass or bed of filler comprise a sinterable or self-bonding filler or contain a sintering or bonding agent, although such arrangement is within the purview of the invention. The self-bonding filler and/or the bonding or sintering agent may be dispersed only in that portion of the bed or filler adjacent to and surrounding the mold of parent metal to a depth sufficient to form upon sintering or otherwise bonding an encasement of the developing cavity which is of sufficient thickness and mechanical strength, to prevent collapse of the cavity (and consequent loss of fidelity of its shape in the grown ceramic body to the shape of the parent metal mold) before a sufficient thickness of the oxidation reaction product is attained. Thus, it suffices if a "support zone" of filler enveloping the mold comprises a filler which is inherently sinterable or self-bonding within the appropriate temperature range or contains a sintering or bonding agent which is effective within the appropriate temperature range. As used herein and in the claims, a "support zone" of filler is that thickness of filler enveloping the mold which, upon bonding, is at least sufficient to provide the structural strength necessary to retain the replicated geometry of the mold until the growing oxidation reaction product becomes self-supporting against cavity collapse as described above. The size of the support zone of filler will vary depending on the size and configuration of the mold and the mechanical strength attained by the sinterable or self-bonding filler in the support zone. The support zone may extend from the surface of the mold into the filler bed for a distance less than that to which the oxidation reaction product will grow or for the full distance of growth. In fact, in some cases the support zone may be quite thin. For example, although the support zone of filler may be a bed of filler encasing the mold and itself encased within a larger bed of non-self-bonding or non-sinterable filler, the support zone may in suitable cases comprise only a coating of self-bonding or sinterable particles adhered to the mold by a suitable adhesive or coating agent. An example of this coating technique is given below.

In any case, the filler should not sinter, fuse or react in such a way as to form an impermeable mass so as to block the infiltration of the oxidation reaction product therethrough or, when a vapor-phase oxidant is used, passage of such vapor-phase oxidant therethrough. Further, any sintered mass which does form should not form at such a low temperature as to fracture due to the expansion mismatch between the metal and the filler before the growth temperature is reached, creating a non-homogeneous composite during development of the matrix due to the matrix subsequently solely filling the fractures in the bonded filler. For example, aluminum parent metal undergoes not only thermal expansion upon heating of the solid or molten metal but a significant volume increase on melting. This requires that the bed of filler in which the parent metal mold is embedded not sinter or otherwise self-bond to form a rigid structure encasing the parent metal mold prior to differential expansion thereof with respect to the filler, lest the expansion crack the self-bonded structure. If this occurs, the replicated shape of the mold is lost or, more typically, a non-homogeneous composite develops upon infiltration of the fractured bed of filler by the growth of oxidation reaction product from the parent metal.

As noted previously, a bonding or sintering agent may be included as a component of the filler in those cases where the filler would not otherwise have sufficient inherent self-bonding or sintering characteristics to prevent collapse of the cavity being formed into the volume formerly occupied by the mold. This bonding agent may be dispersed throughout the filler or in the support zone only. Suitable materials for this purpose include organo-metallic materials which under the oxidizing conditions required to form the oxidation reaction product will at least partially decompose and bind the filler sufficiently to provide the requisite mechanical strength. The binder should not interfere with the oxidation reaction process or leave undesired residual by-products within the ceramic composite product. Binders suitable for this purpose are well known in the art. For example, tetraethylorthosilicate is exemplary of suitable organo-metallic binders, leaving behind at the oxidation reaction temperature a silica moiety which effectively binds the filler with the requisite cohesive strength.

In practicing the process of this invention, the setup of the parent metal and bed in an oxidizing environment is heated to a temperature above the melting point of the metal but below the melting point of the oxidation reaction product, resulting in a body or pool of molten metal. On contact with the oxidant, the molten metal will react to form a layer of oxidation reaction product. Upon continued exposure to the oxidizing environment, within an appropriate temperature region, the remaining molten metal is progressively drawn into and through the oxidation reaction product in the direction of the oxidant and into the bed of filler and there, on contact with the oxidant, forms additional oxidation reaction product. At least a portion of the oxidation reaction product is maintained in contact with and between the molten parent metal and the oxidant so as to cause continued growth of the polycrystalline oxidation reaction product in the bed of filler, thereby embedding filler within the polycrystalline oxidation reaction product. The polycrystalline matrix material continues to grow so long as suitable oxidation reaction conditions are maintained.

The process is continued until the oxidation reaction product has infiltrated and embedded the desired amount of filler. The resulting ceramic composite product includes filler embedded by a ceramic matrix comprising a polycrystalline oxidation reaction product and including, optionally, one or more non-oxidized constituents of the parent metal or voids, or both. Typically in these polycrystalline ceramic matrices, the oxidation reaction product crystallites are interconnected in more than one dimension, preferably in three dimensions, and the metal inclusions or voids may be partially interconnected. When the process is not conducted beyond the exhaustion of the parent metal, the ceramic composite obtained is dense and essentially void-free. When the process is taken to completion, that is, when as much of the metal as possible under the process conditions has been oxidized, pores in the place of the interconnected metal will have formed in the ceramic composite. The resulting ceramic composite product of this invention possesses substantially the original dimensions and geometric configuration of the original mold, adjusted for melting point and thermal expansion differential volume changes of the parent metal during processing with respect to the composite body formed and cooled.

Figure 2:
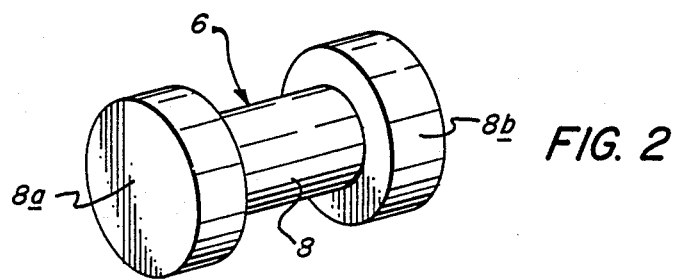
FIG. 2 is a perspective view on a slightly enlarged scale of the mold of shaped parent metal utilized in the assembly of FIG. 1.

Referring now to the drawings, FIG. 1 shows a refractory vessel 2, such as an alumina vessel, containing a bed of filler 4 within which is embedded a mold 6 of parent metal. As shown in FIGS. 1 and 2, mold 6 has a center section 8 which is generally cylindrical in configuration and joins a pair of end sections 8a, 8b which are axially shorter but of greater diameter than center section 8. Generally, mold 6 has a dumb-bell like configuration comprising generally circular disc-shaped end sections joined by a smaller diameter center section.

Figure 3:
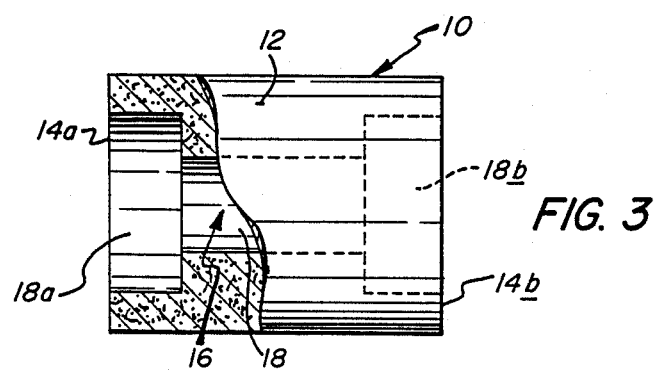
FIG. 3 is a plan view, partly in cross-section, of a self-supporting ceramic composite body made in accordance with the invention.

Upon heating of the assembly of FIG. 1 to a sufficiently high temperature to melt the metal, a vapor-phase oxidant, which permeates the bed of filler 4, and is in contact with the molten metal, oxidizes the molten metal and growth of the oxidation reaction product resulting therefrom infiltrates the surrounding bed of filler 4. For example, when the parent metal is an aluminum parent metal and air is the oxidant, the oxidation reaction temperature may be from about 850° C. to about 1450° C., preferably from about 900° C. to about 1350° C., and the oxidation reaction product is typically alpha-alumina. The molten metal migrates through the forming skin of oxidation reaction product from the volume formerly occupied by mold 6, which will result in a lowered pressure within that volume due to impermeability to the surrounding atmosphere of the growing skin of oxidation reaction product and a net pressure acting on the container-like skin of oxidation reaction product. However, the bed of filler 4 (or a support zone thereof) enveloping mold 6 is intrinsically self-bonding at or above a self-bonding temperature which lies above the melting point of the parent metal and close to but below the oxidation reaction temperature. Thus, upon being heated to its self-bonding temperature, but not before, the filler, or a support zone thereof, has sintered or otherwise bonded to itself and attached to the growing oxidation reaction product sufficiently to afford sufficient strength to the filler surrounding the developing cavity, i.e., the support zone of filler, to resist the pressure differential and thereby retain within the bed of filler 4 the geometry of the filled cavity formed therein by conformance of the filler to the shape of mold 6. As described in detail above, if the filler were to self-bond significantly prior to completion of expansion of the parent metal upon heating and melting thereof, the self-bonded filler would be cracked or broken by expansion of the metal. In an embodiment in which only a support zone of filler 4 contains or comprises a sinterable or self-bonding filler or a bonding or sintering agent, dotted line 5 in FIG. 1 indicates the extent of the support zone in the bed of filler 4. As the reaction continues, the cavity within bed 4 formerly filled by mold 6 is substantially entirely evacuated by the migration of molten parent metal through the oxidation reaction product to the outer surface thereof where it contacts the vapor-phase oxidant and is oxidized to form additional oxidation reaction product. The oxidation reaction product comprises a polycrystalline ceramic material which may contain inclusions therein of unoxidized constituents of the molten parent metal. Upon completion of the reaction and evacuation of the volume formerly occupied by mold 6, the assembly is allowed to cool and the resultant ceramic composite, whose dimensions are indicated by dotted line 7 in FIG. 1 is separated from excess filler, if any, left within vessel 2. Such excess filler or part thereof may form a coherent body because of the sintering or self-bonding and may readily be removed from the ceramic composite which it encases by grit blasting, grinding, or the like. An economical technique is to employ grit blasting utilizing grit particles of a material which is suitable as the filler or as a component of the filler so that the removed filler and grit may be reused as filler in a subsequent operation. It is important to recognize that the degree of strength of the self-bonded filler necessary to prevent cavity collapse during processing is typically much less than the strength of the resulting composite. Hence, it is in fact quite feasible to remove excess self-bonded filler by grit blasting without significant concern for damaging the resultant composite. In any case, the ceramic composite structure having the cavity formed therein may be further shaped by machining or grinding or otherwise forming it to a desired outer shape. For example, as illustrated in FIG. 3, the ceramic composite 10 has been ground into the shape of a circular cylinder having an outer surface 12, opposite end faces 14a, 14b and having therein a cavity 16 which is defined by surfaces congruent to the surfaces of mold 6. Thus, the shape of cavity 16 is an inverse replication of the shape of mold 6, cavity 16 being defined by end sections 18a, 18b and a connecting center section 18 of lesser diameter than end sections 18a, 18b. For many applications the ceramic body may be utilizable as formed following removal of the excess, unentrained filler, without further requirement for grinding or machining.

By selecting an appropriate filler and maintaining the oxidation reaction conditions for a time sufficient to evacuate substantially all the molten parent metal from the filled cavity initially occupied by mold 6, a faithful inverse replication of the geometry of mold 6 is attained by cavity 16. While the illustrated shape of mold 6 (and therefore of cavity 16) is relatively simple, cavities can be formed within the ceramic composite which inversely replicate with fidelity the shapes of molds of much more complex geometry than that of mold 6, by the practices of the present invention. The outer surfaces of the ceramic composite 10 may, if desired, be ground and machined or otherwise formed to any desired size or shape consistent with the size and shape of the cavity 16 formed therein.

It should be understood that the filler properties of being permeable, conformable, and self-bonding as described above are properties of the overall composition of the filler, and that individual components of the filler need not have any or all of these characteristics. Thus, the filler may comprise either a single material, a mixture of particles of the same material but of different mesh size, or mixtures of two or more materials. In the latter case, some components of the filler may, for example, not be sufficiently self-bonding or sinterable at the oxidation reaction temperature but the filler of which it is a component part will have the requisite self-bonding or sintering characteristics at and above its self-bonding temperature because of the presence of other materials. A large number of materials which make useful fillers in the ceramic composite by imparting desired qualities to the composite also will have the permeable, conformable and self-bonding qualities described above. Such suitable materials will remain unsintered or unbonded sufficiently at temperatures below the oxidation reaction temperature so that the filler in which the mold is embedded can accommodate thermal expansion and melting point volume change, and yet will sinter or otherwise self-bond only upon attaining a self-bonding temperature which lies above the parent metal melting point but close to and below the oxidation reaction temperature, sufficiently to impart the requisite mechanical strength to prevent collapse of the forming cavity during the initial stages of growth or development of the oxidation reaction product.

With respect to individual components of the filler, one suitable class of filler component includes those chemical species which, under the temperature and oxidizing conditions of the process, are not volatile, are thermodynamically stable and do not react with or dissolve excessively in the molten parent metal. Numerous materials are known to those skilled to the art as meeting such criteria in the case where aluminum parent metal and air or oxygen as the oxidant is eployed. Such materials include the single-metal oxides of: aluminum, $Al_2O_3$; cerium, $CeO_2$; hafnium, $HfO_2$; lanthanum, $La_2O_3$; neodymium, $Nd_2O_3$; praseodymium, various oxides; samarium, $Sm_2O_3$; scandium, $Sc_2O_3$; thorium, $ThO_2$; uranium, $UO_2$; yttrium, $Y_2O_3$; and zirconium, $ZrO_2$. In addition, a large number of binary, ternary, and higher order metallic compounds such as magnesium aluminate spinel, $MgO.Al_2O_3$, are contained in this class of stable refractory compounds. A second class of suitable filler components are those which are not intrinsically stable in the oxidizing and high temperature environment of the preferred embodiment, but which, due to relatively slow kinetics of the degradation reactions, can be incorporated as a filler phase within the growing ceramic body. An example is silicon carbide. This material would oxidize completely under the conditions necessary to oxidize, for example, aluminum with oxygen or air in accordance with the invention were it not for a protective layer of silicon oxide forming and covering the silicon carbide particles to limit further oxidation of the silicon carbide. The protective silicon oxide layer also enables silicon carbide particles to sinter or bond to themselves and to other components of the filler under the oxidation reaction conditions of the process for aluminum parent metal with air or oxygen as the oxidant.

A third class of suitable filler components are those, such as carbon fibers, which are not, on thermodynamic or on kinetic grounds, expected to survive the oxidizing environment or the exposure to molten aluminum involved with a preferred embodiment, but which can be made compatible with the process if (1) the environment is made less active, for example, through the use of $CO/CO_2$ as the oxidizing gases, or (2) through the application of a coating thereto, such as aluminum oxide, which makes the species kinetically non-reactive in the oxidizing environment.

As a further embodiment of the invention and as explained in the Commonly Owned patent applications, the addition of dopant materials to the metal can favorably influence the oxidation reaction process. The function or functions of the dopant material can depend upon a number of factors other than the dopant material itself. These factors include, for example, the particular parent metal, the end product desired, the particular combination of dopants when two or more dopants are used, the use of an externally applied dopant in combination with an alloyed dopant, the concentration of the dopant, the oxidizing environment, and the process conditions.

The dopant or dopants (1) may be provided as alloying constituents of the parent metal, (2) may be applied to at least a portion of the surface of the parent metal, or (3) may be applied to the filler or to a part of the filler bed, e.g., the support zone of the filler, or any combination of two or more techniques (1), (2) and (3) may be employed. For example, an alloyed dopant may be used in combination with an externally applied dopant. In the case of technique (3), where a dopant or dopants are applied to the filler, the application may be accomplished in any suitable manner, such as by dispersing the dopants throughout part or the entire mass of filler as coatings or in particulate form, preferably including at least a portion of the bed of filler adjacent the parent metal. Application of any of the dopants to the filler may also be accomplished by applying a layer of one or more dopant materials to and within the bed, including any of its internal openings, interstices, passageways, intervening spaces, or the like, that render it permeable. A convenient manner of applying any of the dopant material is to merely soak the entire bed in a liquid (e.g., a solution), of dopant material. A source of the dopant may also be provided by placing a rigid body of dopant in contact with and between at least a portion of the parent metal surface and the filler bed. For example, a thin sheet of silicon-containing glass (useful as a dopant for the oxidation of an aluminum parent metal) can be placed upon a surface of the parent metal. When the aluminum parent metal (which may be internally doped with Mg) overlaid with the silicon-containing material is melted in an oxidizing environment (e.g., in the case of aluminum in air, between about 850° C. to about 1450° C., preferably about 900° C. to about 1350° C.), growth of the polycrystalline ceramic material into the permeable bed occurs. In the case where the dopant is externally applied to at least a portion of the surface of the parent metal, the polycrystalline oxide structure generally grows within the permeable filler substantially beyond the dopant layer (i.e., to beyond the depth of the applied dopant layer). In any case, one or more of the dopants may be externally applied to the parent metal surface and/or to the permeable bed. Additionally, dopants alloyed within the parent metal and/or externally applied to the parent metal may be augmented by dopant(s) applied to the filler bed. Thus, any concentration deficiencies of the dopants alloyed within the parent metal and/or externally applied to the parent metal may be augmented by additional concentration of the respective dopant(s) applied to the bed, and vice versa.

Useful dopants for an aluminum parent metal, particularly with air as the oxidant, include, for example, magnesium metal and zinc metal, in combination with each other or in combination with other dopants as described below. These metals, or a suitable source of the metals, may be alloyed into the aluminum-based parent metal at concentrations for each of between about 0.1–10% by weight based on the total weight of the resulting doped metal. The concentration for any one dopant will depend on such factors as the combination of dopants and the process temperature. Concentrations within this range appear to initiate the cramic growth, enhance metal transport and favorably influence the growth morphology of the resulting oxidation reaction product.

Other dopants which are effective in promoting polycrystalline oxidation reaction growth, for aluminum-based parent metal systems are, for example, silicon, germanium, tin and lead, especially when used in combination with magnesium or zinc. One or more of these other dopants, or a suitable source of them, is alloyed into the aluminum parent metal system at concentrations for each of from about 0.5 to about 15% by weight of the total alloy; however, more desirable growth kinetics and growth morphology are obtained with dopant concentrations in the range of from about 1–10% by weight of the total parent metal alloy. Lead as a dopant is generally alloyed into the aluminum-based parent metal at a temperature of at least 1000° C. so as to make allowances for its low solubility in aluminum; however, the addttion of other alloying components, such as tin, will generally increase the solubility of lead and allow the alloying material to be added at a lower temperature.

One or more dopants may be used depending upon the circumstances, as explained above. For example, in the case of an aluminum parent metal and with air as the oxidant, particularly useful combinations of dopants include (a) magnesium and silicon or (b) magnesium, zinc and silicon. In such examples, a preferred magnesium concentration falls within the range of from about 0.1 to about 3% by weight; for zinc in the range of from about 1 to about 6% by weight; and for silicon in the range of from about 1 to about 10% by weight.

Additional examples of dopant materials useful with an aluminum parent metal, include sodium, lithium, calcium, boron, phosphorus and yttrium which may be used individually or in combination with one or more dopants depending on the oxidant and process conditions. Sodium and lithium may be used in very small amounts in the parts per million range, typically about 100–200 parts per million, and each may be used alone or together, or in combination with other dopant(s). Rare earth elements such as cerium, lanthanum, praseodymium, neodymium and samarium are also useful dopants, and herein again especially when used in combination with other dopants.

As noted above, it is not necessary to alloy any dopant material into the parent metal. For example, selectively applying one or more dopant materials in a thin layer to either all, or a portion of, the surface of the parent metal enables local ceramic growth from the parent metal surface or portions thereof and lends itself to growth of the polycrystalline ceramic material into the permeable filler in selected areas. Thus, growth of the polycrystalline ceramic material into the permeable bed can be controlled by the localized placement of the dopant material upon the parent metal surface. The applied coating or layer of dopant is thin relative to the thickness of the parent metal body, and growth or formation of the oxidation reaction product into the permeable bed extends to substantially beyond the dopant layer, i.e., to beyond the depth of the applied dopant layer. Such layer of dopant material may be applied by painting, dipping, silk screening, evaporating, or otherwise applying the dopant material in liquid or paste form, or by sputtering, or by simply depositing a layer of a solid particulate dopant or a solid thin sheet or film of dopant onto the surface of the parent metal. The dopant material may, but need not, include either organic or inorganic binders, vehicles, solvents, and/or thickeners. More preferably, the dopant materials are applied as powders to the surface of the parent metal or dispersed through at least a portion of the filler. One particularly preferred method of applying the dopants to the parent metal surface is to utilize a liquid suspension of the dopants in a water/organic binder mixture sprayed onto a parent metal surface in order to obtain an adherent coating which facilitates handling of the doped parent metal prior to processing.

The dopant materials when used externally are usually applied to a portion of a surface of the parent metal as a uniform coating thereon. The quantity of dopant is effective over a wide range relative to the amount of parent metal to which it is applied and, in the case of aluminum, experiments have failed to identify either upper or lower operable limits. For example, when utilizing silicon in the form of silicon dioxide externally applied as the dopant for an aluminum-based parent metal using air or oxygen as the oxidant, quantities as low as 0.0001 gram of silicon per gram of parent metal together with a second dopant having a source of magnesium and/or zinc produce the polycrystalline ceramic growth phenomenon. It also has been found that a ceramic structure is achievable from an aluminum-based parent metal using air or oxygen as the oxidant by using MgO as the dopant in an amount greater than 0.0005 gram of dopant per gram of parent metal to be oxidized and greater than 0.005 gram of dopant per square centimeter of parent metal surface upon which the MgO is applied. It appears that to some degree an increase in the quantity of dopant materials will decrease the reaction time necessary to produce the ceramic composite, but this will depend upon such factors as type of dopant, the parent metal and the reaction conditions.

Where the parent metal is aluminum internally doped with magnesium and the oxidizing medium is air or oxygen, it has been observed that magnesium is at least partially oxidized out of the alloy at temperatures of from about 820° to 950° C. In such instances of magnesium-doped systems, the magnesium forms a magnesium oxide and/or magnesium aluminate spinel phase at the surface of the molten aluminum alloy and during the growth process such magnesium compounds remain primarily at the initial oxide surface of the parent metal alloy (i.e., the "initiation surface") in the growing ceramic structure. Thus, in such magnesium-doped systems, an aluminum oxide-based structure is produced apart from the relatively thin layer of magnesium aluminate spinel at the initiation surface. Where desired, this initiation surface can be readily removed as by grinding, machining, polishing or grit blasting.

The ceramic composite structures obtained by the practice of the present invention will usually be a dense, coherent mass wherein between about 5% and about 98% by volume of the total volume of the composite structure is comprised of one or more of the filler components embedded within a polycrystalline ceramic matrix. The polycrystalline ceramic matrix is usually comprised of, when the parent metal is aluminum and air or oxygen is the oxidant, about 60% to about 99% by weight (of the weight of polycrystalline matrix) of interconnected alpha-alumina and about 1% to 40% by weight (same basis) of non-oxidized metallic constituents, such as from the parent metal.

The invention is further illustrated by the following non-limiting examples.

EXAMPLE 1

To illustrate the replication of a complex geometry in a ceramic matrix composite containing silicon carbide particles, a 1 inch diameter by 6 inch long threaded rod of aluminum containing 10% silicon and 3% magnesium was completely submerged into a bed of silicon carbide (Norton Co. 39 Crystalon, 90 mesh) and heated to a process setpoint temperature of 1125° C. for 72 hours in air. The total furnace time equaled 87 hours with 5 hour heat-up and 10 hour cool-down cycles.

Figure 4:
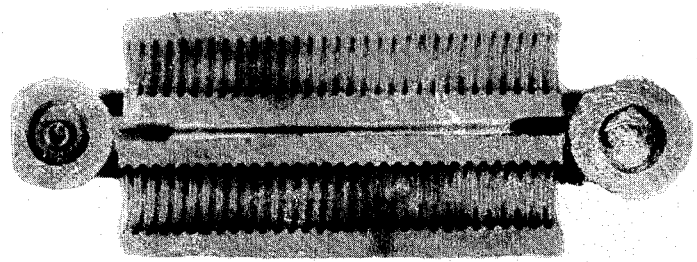
FIG. 4 is a photograph of a ceramic composite prepared in accordance with Example 1, and sectioned to show the internal geometry replicating the shape of a threaded rod as the parent metal.

The resulting composite material was cross sectioned to show the replication of the threaded rod into the alumina ceramic matrix/silicon carbide composite material, and as such is pictured in FIG. 4. The composition of the resulting composite was confirmed by X-ray powder diffraction analysis.

In this instance, self-bonding of the bed was observed and is believed to be a consequence of partial oxidation of the silicon carbide particles at the process temperature to form a layer of silica bonding material.

EXAMPLE 2

To illustrate the replication of a complex geometry in a ceramic matrix composite containing alumina particles, a layer of silicon dioxide particles was applied with an organic binder to the surface of a 2 inch threaded rod of aluminum containing 10% silicon and 3% magnesium. The rod was then completely embedded into a bed of alumina (Norton Co. 38 Alundum, 220 mesh) and heated to a process setpoint temperature of 1250° C. for 50 hours. The total furnace time was 60 hours, with 5 hour heat-up and 5 hour cool-down cycles.

Figure 5:
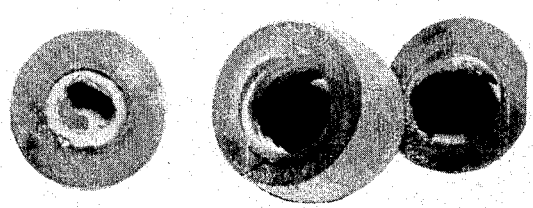
FIG. 5 is a photograph of a ceramic composite with the top and bottom removed to show the shape replication of a threaded metal ingot.

The cross sectioned rod showed the replication of the threaded rod, and as such is pictured in FIG. 5. The composition of the resulting composite material was confirmed by X-ray powder diffraction analysis. In this case, it is believed that the layer applied to the alloy surface bonded to each other and to the adjacent alumina particles to form a "support zone" to enable the surface replication process.

It should be noted that the screw thread geometry of FIGS. 4 and 5 would be particularly difficult to make by any of the traditional ceramic processing methods, but is quite readily produced by the process of the present invention.

EXAMPLE 3

This specific embodiment of the present invention illustrates the formation of a complex geometry in a ceramic matrix composite using a bed of alumina particles in a bonding agent and a support zone. In this experiment, a 22 gauge stainless steel cylinder was used as the container for the set-up of parent metal and filler. The container had an internal diameter of 3¼ inches and 0.0625 inch diameter perforation to provide for a 40% open area for diffusion of a vapor-phase oxidant into the bed of filler. This container was lined with a stainless steel screen having 0.016 inch diameter holes and 30% open area to prevent the escape of filler material through the perforations of the container. This container or vessel was sealed at the bottom end with a stainless steel cap, and was filled with a pre-fired heterogeneous filler material comprised of 95 weight percent alpha-alumina particles (Norton Co. 38 Alundum, 90 mesh) and 5 weight percent silicon dioxide (predominantly 100 mesh size or larger). A rod of aluminum, measuring 26 inches long by 1 1/16 inches in diameter and alloyed with 10% silicon and 3% magnesium, was cast as to have on its surface, over the center two thirds of its length, 16 fin-like protrusions, which was used to demonstrate the fidelity of shape replication of a more complex mold. The rod was covered uniformly over its entire surface with silicon dioxide (predominantly 100 mesh size or larger) applied thereto with an organic binder. The rod was submerged into the above-described filler contained in the vessel such that growth of the ceramic matrix would be symmetric and axially toward the walls of the stainless steel vessel.

The system above was heated to a setpoint temperature of 1250° C. for 225 hours. The total furnace time was 265 hours, with 10 hour heat-up and 30 hour cool-down cycles.

The above process produced a cohesive composite material having an alpha-alumina matrix embedding the alpha-alumina particles of the filler material, as evidenced by X-ray powder diffraction analysis. The cavity exhibited high fidelity, inverse replication of the geometry of the cast aluminum rod.

Although only a few exemplary embodiments of the invention have been described in detail above, those skilled in the art will readily appreciate that the present invention embraces many combinations and variations other than those exemplified.

What is claimed is:

1. A method for producing a self-supporting ceramic composite body having therein at least one cavity which inversely replicates the geometry of a mold of shaped parent metal, said composite body comprising (1) a ceramic matrix obtained by oxidation of molten parent metal to form a polycrystalline material comprising an oxidation reaction product of said parent metal with an oxidant; and (2) a filler embedded by said matrix, the method comprising the steps of:

(a) shaping a parent metal to provide a mold of shaped parent metal;

(b) embedding said mold of shaped parent metal within a bed of conformable filler to inversely replicate therein the geometry of said mold of shaped parent metal, said filler being characterized by (1) being permeable to said oxidant under the process conditions in step (c) and being permeable to infiltration by the growth of the oxidation reaction product through said bed of conformable filler, (2) retaining sufficient conformability to provide for accommodation of the melting-point volume change of said parent metal and differential thermal expansion between said parent metal and said bed of conformable filler under the process conditions in step (c) and (3) at least in a support zone thereof enveloping said mold of shaped parent metal, being intrinsically self-bonding only at a temperature above the melting point of said parent metal but below and sufficiently close to the oxidation reaction temperature to allow said accommodation, whereby said filler has sufficient cohesive strength to retain the inversely replicated geometry within said bed of conformable filler under the process conditions in step (c);

(c) heating said embedded mold of shaped parent metal to a temperature above its melting point but below the melting point of said oxidation reaction product to form a body of molten parent metal and, at said temperature,
  (1) reacting the moleten parent metal with said oxidant to form said oxidation reaction product,
  (2) maintaining at least a portion of said oxidation reaction product in contact with and between said body of molten metal and said oxidant, to progressively draw molten metal from said body of molten metal through the oxidation reaction product and into said bed of filler to concurrently form said cavity in said bed of filler as fresh oxidation reaction product continues to form at an interface between said oxidant and previously formed oxidation reaction product, and
  (3) continuing said reacting for a time sufficient to at least partially embed said bed of conformable filler with said oxidation reaction product by growth of the oxidation reaction product to form said composite body having said cavity therein; and (d) recovering the resulting self-supporting composite body.

2. The method of claim 1, wherein said oxidant comprises a vapor-phase oxidant.

3. The method of claim 1, wherein said parent metal comprises an aluminum parent metal.

4. The method of claim 2, wherein said parent metal comprises an aluminum parent metal.

5. The method of claim 1, wherein said oxidant comprises a solid at said temperature.

6. The method of claim 5, wherein said oxidant comprises an oxidant selected from the group consisting of silica, boron and reducible boride.

7. The method of claim 2, wherein said oxidant comprises an oxygen-containing gas.

8. The method of claim 2, wherein said oxidant comprises a nitrogen-containing gas.

9. The method of claim 5 or claim 6, wherein said parent metal comprises an aluminum parent metal.

10. The method of claim 1 or 2, wherein said parent metal comprises a material selected from the group consisting of silicon, titanium, tin, zirconium and hafnium.

11. The method of claim 1, claim 2 or claim 3, wherein said oxidant comprises a material selected from the group consisting of an oxygen-containing gas, a nitrogen-containing gas, a halogen, sulphur, phosphorus, arsenic, carbon, boron, selenium, tellurium, an $H_2/H_2O$ mixture, methane, ethane, propane, acetylene, ethylene, propylene, and a $CO/CO_2$ mixture, or compounds or mixtures thereof.

12. The method of claim 2 or claim 3, wherein said oxidant comprises air.

13. The method of claim 2, wherein said oxidant comprises an $H_2/H_2O$ mixture.

14. The method of claim 2, wherein said oxidant comprises a $CO/CO_2$ mixture.

15. The method of claim 2 or claim 3, wherein said oxidant comprises forming gas.

16. The method of claim 1, claim 2 or claim 3, wherein said filler comprises a material selected from the group consisting of hollow bodies, particulates, powders, fibers, whiskers, spheres, bubbles, steelwool, plates, aggregate, wires, rods, bars, platelets, pellets, tubes, refractory fiber cloth, tubules, or mixtures thereof.

17. The method of claim 1, claim 2 or claim 3, wherein said filler comprises a material selected from the group consisting of at least one single metal oxide of a metal selected from the group consisting of aluminum, cerium, hafnium, lanthanum, neodymium, praseodymium, samarium, scandium, thorium, uranium, yttrium, and zirconium.

18. The method of claim 1, claim 2 or claim 3, wherein said filler comprises a material selected from the group consisting of at least one of aluminum oxide, silica, silicon carbide, silicon aluminum oxynitride, zirconium oxide, barium titanate, boron nitride, silicon nitride, magnesium aluminate, ferrous alloys, iron-chromium-aluminum alloy, carbon and aluminum.

19. The method of claim 1, claim 2 or claim 3, wherein said filler comprises a solid oxidant.

20. The method of claim 18, wherein said filler comprises a material selected from the group consisting of silica, silicon carbide and alumina.

21. The method of claim 3, wherein said oxidant comprises an oxygen-containing gas and said temperature is from about 850° C. to about 1450° C.

22. The method of claim 3, wherein said oxidant comprises an oxygen-containing gas and said temperature is from about 900° C. to about 1350° C.

23. The method of claim 1, wherein said oxidant comprises a liquid at said temperature.

24. The method of claim 1, further comprising doping said parent metal with a dopant.

25. The method of claim 2, further comprising doping said parent metal with a dopant.

26. The method of claim 3, further comprising doping said parent metal with a dopant.

27. The method of claim 24, claim 25 or claim 26, wherein at least one dopant is alloyed into the parent metal.

28. The method of claim 24, claim 25 or claim 26, wherein at least one dopant is applied as a alyer of dopant material onto a surface of said parent metal, and including forming the oxidation reaction product through and beyond the depth of the applied layer of dopant material.

29. The method of claim 24, claim 25 or claim 26, further comprising providing at least one dopant material at least partially within said filler.

30. The method of claim 24, claim 25 or claim 26, wherein said dopant comprises a source of at least two materials from the group consisting of magnesium, zinc, silicon, germanium, tin, lead, boron, sodium, lithium, calcium, phosphorus, yttrium, and a rare earth metal.

31. The method of claim 30, wherein said rare earth metal comprises a material selected from the group consisting of lanthanum, cerium, praseodymium, neodymium and samarium.

32. The method of claim 24, claim 25 or claim 26, wherein said dopant material comprises a source of at least one material selected from the group consisting of magnesium, zinc, silicon, germanium, tin, lead, boron, sodium, lithium, calcium, phosphorus, yttrium and a rare earth metal.

33. The method of claim 32, wherein said rare earth metal comprises a material selected from the group consisting of lanthanum, cerium, praseodymium, neodymium and samarium.

34. The method of claims 1, 2, 3, 21, 22 or 24, further comprising incorporating a bonding agent into said filler, at least in said support zone thereof.

35. The method of claim 24, wherein said polycrystalline material further comprises an initiation surface of a spinel formed as an oxidation reaction product of said parent metal, said dopant and said oxidant.

36. The method of claim 35, wherein said dopant comprises at least one material selected from the group consisting of magnesium and a source of magnesium, and said parent metal comprises an aluminum parent metal.

37. The method of claim 24, claim 25 or claim 26, further comprising at least one of alloying a dopant with said parent metal and applying an alloy to a surface of said parent metal.

38. The method of claim 37, further comprising incorporating at least one dopant into at least a portion of said filler.

* * * * *

UNITED STATES PATENT AND TRADEMARK OFFICE
CERTIFICATE OF CORRECTION

PATENT NO. : 4,828,785
DATED : May 9, 1989
INVENTOR(S) : Marc S. Newkirk, et al.

It is certified that error appears in the above-indentified patent and that said Letters Patent is hereby corrected as shown below:

```
On the cover page under item [56] entitled "Other Publications" (second
                          reference listed) change "Furnaces'" to --
                          Furnaces"--.
On the cover page under item [57] entitled "Abstract", line 4: remove the
                          comma after "method".
                          line 6: change "there in" to --therein--.
Column 2, line 15:        change "atain" to --attain--.
Column 2, line 57:        change "Increases" to --increases--.
Column 8, line 63:        change "oolapse" to --collapse--.
Column 13, line 54:       change "eployed" to --employed--.
Column 15, line 30:       change "cramic" to --ceramic--.
Column 19, line 67:       after "or" insert --claim--.
```

Signed and Sealed this

First Day of February, 1994

BRUCE LEHMAN

Attest:

Attesting Officer        Commissioner of Patents and Trademarks